UNITED STATES PATENT OFFICE.

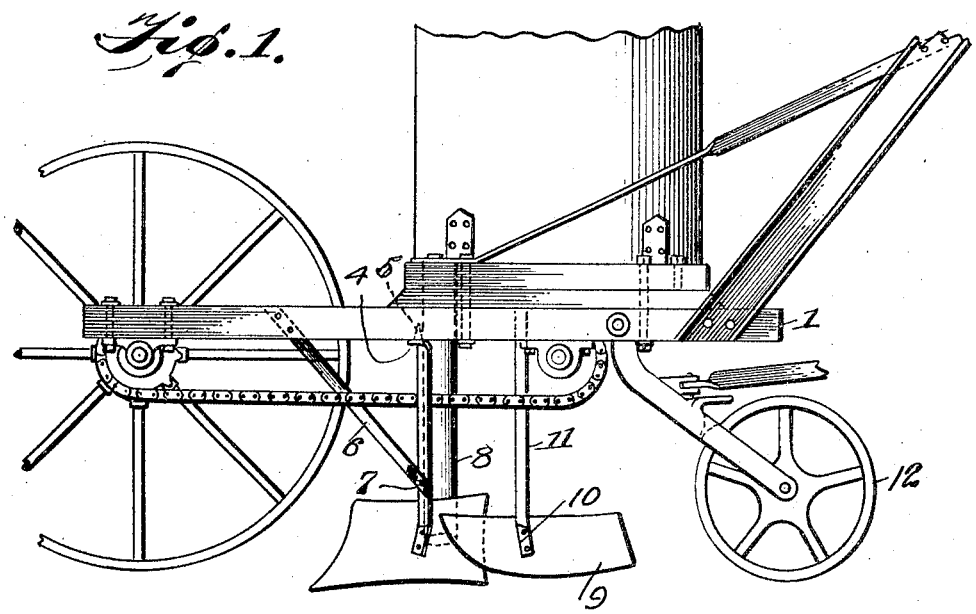
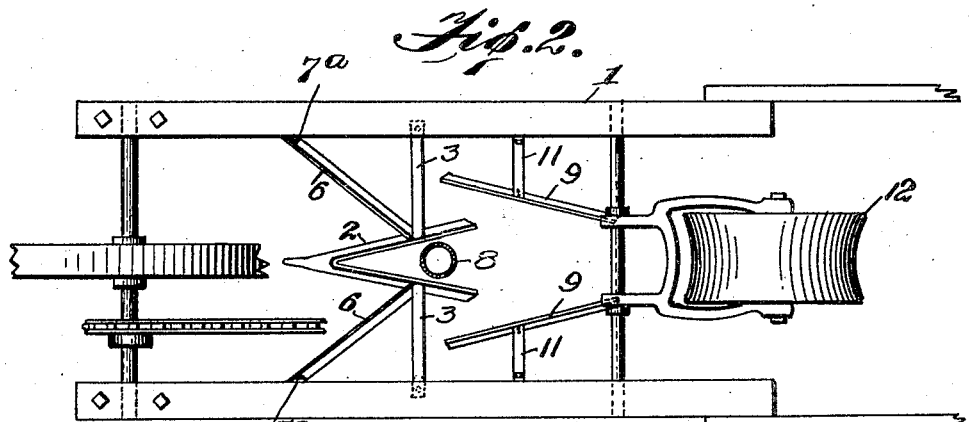
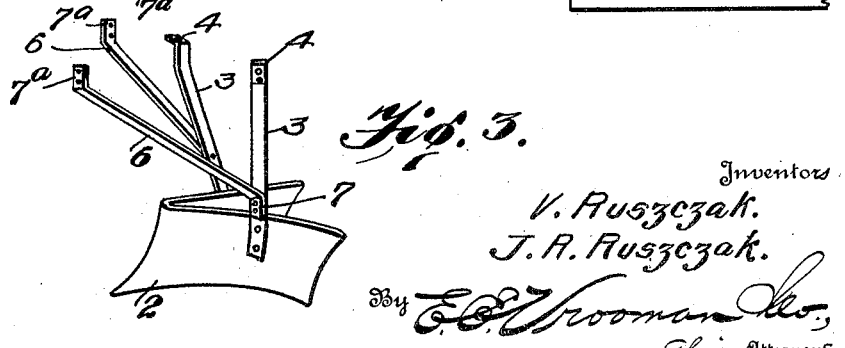

VALENTINE RUSZCZAK AND JOHN RUSZCZAK, OF CHICAGO, ILLINOIS.

FURROW-OPENING APPARATUS.

1,404,795. Specification of Letters Patent. Patented Jan. 31, 1922.

Original application filed November 19, 1919, Serial No. 339,035. Divided and this application filed December 7, 1920. Serial No. 428,924.

*To all whom it may concern:*

Be it known that we, VALENTINE RUSZCZAK and JOHN, citizens of the United States, residing at Chicago, in the county of Cook and State of Illinois, have invented certain new and useful Improvements in Furrow-Opening Apparatus, of which the following is a specification, reference being had therein to the accompanying drawings.

This invention relates to a furrow opening and closing apparatus, and the object of the invention is the provision of simple and efficient means for forming a furrow, and then after the seed has been planted, means is provided for closing the furrow.

This application is a divisional case, growing out of our original application, Serial No. 339,035, allowed July 12, 1920.

With the above and other objects in view, our invention comprises certain novel combinations, constructions and arrangements of parts as will be hereinafter described, illustrated in the accompanying drawings, and more particularly pointed out in the appended claim.

In the drawings:

Figure 1 is a view in side elevation of an apparatus constructed in accordance with the present invention, while Figure 2 is a top, plan view of the same.

Figure 3 is a perspective view of the V-shaped furrow opener, and the primary and auxiliary braces attached thereto.

Referring to the drawings by numerals, 1 designates the main frame to which is secured our furrow opening and closing apparatus.

Our apparatus includes a V-shaped furrow opener 2, to the outside of which are secured the primary braces 3; these braces 3 are bent at the lower end to conform to the contour of the outer face of the furrow opener 2, whereas the upper ends 4 are bent at an angle to fit against the under faces of the frame 1, Fig. 1, and through the ends 4 are suitable fastening means such as screws 5, Fig. 1, for securing the primary braces to the frame. Inclined, auxiliary braces 6 are employed having lower, angled ends 7, which ends 7 are secured against the outer faces of the primary braces 3, above the furrow opener, and intermediate the ends of said braces 3. The upper, angularly-disposed ends 7ª, of the auxiliary braces 6, are secured against the sides of the frame 1, Figs. 1 and 2.

The hollow guide 8 is used to direct the seed into the furrow after it has been formed by the furrow opener 2, and then the cover blades 9 serve to throw or force the dirt displaced by the furrow opener 2 back into the furrow, closing the same and covering the seed discharged through the guide 8. The cover blades 9 are arranged in the shape of a V and are supported upon the lower, angularly-disposed ends 10 of the braces or brackets 11, which brackets 11 are secured at their upper ends to the frame 1. The covering and packing roller 12 is employed to somewhat pack or make more firm the loose dirt that has been forced or thrown back into the furrow as the machine passed over the ground.

For further information about the general structure of our improved onion planting machine, reference may be had to our allowed application, Serial No. 339,035, hereinbefore specified.

While we have described the preferred embodiment of our invention, and have illustrated the same in the accompanying drawings, certain minor changes or alterations may appear to one skilled in the art to which this invention relates, during the extensive manufacture of the same and we, therefore, reserve the right to make such alterations or changes as shall fairly fall within the scope of the appended claim.

What we claim is:

In an apparatus of the class described, the combination with a frame, of a V-shaped furrow opener, a pair of primary braces bent at their lower ends to conform to the contour of the outer face of and secured to the furrow opener, said primary braces having their upper ends bent at an angle to fit against the under faces of and secured to the frame, auxiliary inclined braces provided with lower angled ends secured to the primary braces intermediate their ends and above the furrow opener, and said auxiliary braces provided with upper angularly-disposed ends secured against the sides of the frame.

In testimony whereof we hereunto affix our signatures.

VALENTINE RUSZCZAK.
JOHN RUSZCZAK.